United States Patent
Yu

(10) Patent No.: US 6,627,025 B1
(45) Date of Patent: Sep. 30, 2003

(54) METHOD AND APPARATUS FOR EXTRUDING EASILY-SPLITTABLE PLURAL-COMPONENT FIBERS FOR WOVEN AND NONWOVEN FABRICS

(75) Inventor: Jing-Peir Yu, deceased, late of Pensacola, FL (US), by Shiang-Jung Ma Yu, legal representative

(73) Assignee: Hills, Inc., West Melbourne, FL (US)

( * ) Notice: Subject to any disclaimer, the term of this patent is extended or adjusted under 35 U.S.C. 154(b) by 0 days.

(21) Appl. No.: 09/647,236

(22) PCT Filed: Mar. 25, 1999

(86) PCT No.: PCT/US99/06517
§ 371 (c)(1),
(2), (4) Date: Dec. 21, 2001

(87) PCT Pub. No.: WO99/48668
PCT Pub. Date: Sep. 30, 1999

Related U.S. Application Data
(60) Provisional application No. 60/079,323, filed on Mar. 25, 1998.

(51) Int. Cl.[7] .............................. B29C 47/30; D01F 8/04
(52) U.S. Cl. .................. 156/167; 156/181; 264/172.14; 425/72.2; 425/131.5; 425/463
(58) Field of Search ................................. 156/180, 181, 156/167; 425/72.2, 131.5, 463; 264/172.14

(56) References Cited
U.S. PATENT DOCUMENTS 2,959,839 A * 11/1960 Craig .......................... 442/195
3,802,817 A    4/1974 Matsuki et al.
4,239,720 A   12/1980 Geriach et al.
4,720,314 A *  1/1988 Black .......................... 156/167
4,740,339 A *  4/1988 Bach et al. .................. 264/168
5,093,061 A *  3/1992 Bromley et al. ....... 264/172.14
5,759,926 A *  6/1998 Pike et al. .................. 442/333
6,004,673 A   12/1999 Nishijima

* cited by examiner

Primary Examiner—Sam Chuan Yao
(74) Attorney, Agent, or Firm—Edell, Shapiro & Finnan LLC

(57) ABSTRACT

A spinneret 20 for producing easily splittable plural-component fibers includes two passages 22 and 26 for respectively delivering two incompatible polymers (A and B) to two sets of inclined capillaries 34–39, 46–51. The two sets of capillaries converge toward each other in a downstream direction and direct molten polymer streams to two respective rows of orifices 40–45, 52–57. The centerlines of the polymer A capillaries lie along axes that, when extended beyond the spinneret, are offset and non-intersecting with axes along which the centerlines of the polymer B capillaries lie, such that the centerlines of the extruded polymer streams are directed along non-intersecting axes. The capillary angles and orifice arrangement cause the extruded polymer streams to extend toward each other in an interleaved fashion, with the polymer streams contacting each other in a generally tangential manner.

9 Claims, 7 Drawing Sheets

METHOD AND APPARATUS FOR EXTRUDING EASILY-SPLITTABLE PLURAL-COMPONENT FIBERS FOR WOVEN AND NONWOVEN FABRICS

CROSS REFERENCE TO RELATED APPLICATIONS

This application claims priority from U.S. Provisional Patent Application Serial No. 60/079,323, entitled "Easily Splittable Multi-segment Ribbon Shaped Conjugate Fibers for Non-woven Fabrics," filed Mar. 25, 1998. The disclosure of this provisional patent application is incorporated herein by reference in its entirety.

BACKGROUND OF THE INVENTION

1. Field of the Invention

The present invention relates to a method and apparatus for producing plural-component filament or fiber yarns having individual constituent micro-denier sub-filaments or sub-fibers that are easily separated and, in particular, to a method and apparatus for extruding easily splittable plural-component fibers suitable for making nonwoven fabrics in a spunbond process or woven fabrics.

2. Description of the Related Art

Various attempts have been made to produce woven and nonwoven fabrics having improved characteristics, such as greater bulkiness and softness, superior flexibility and drape, and better barrier and filtration properties for use in products such as disposable absorbent articles, medical garments and filtration materials. It has been found that nonwoven fabrics having desirable qualities can be manufactured from splittable plural-component fibers. Such plural-component fibers typically include at least two different polymers arranged as microfilaments or segments across the transverse cross section of the fiber, which segments extend continuously along the length of the fiber. By separating these plural-component fibers into their constituent segments after extrusion, a fine denier fabric with desirable characteristics can be produced.

Such a finer denier fabric is difficult to produce without employing splittable plural-component fibers. Individual fibers having a transverse cross-sectional area comparable to a single segment of a plural-component fiber are difficult to manipulate and generally cannot withstand the drawing process applied to attenuate extruded fibers without breakage. The use of plural-component fibers permits formation of a finer denier fabric, because plural fiber segments are joined to each other during at least a portion of the drawing and attenuation process, thereby forming a thicker combined fiber that can more readily be drawn and attenuated. Once drawn, the plural-component fibers can then be split into very fine sub-fiber segments.

A known method of producing plural-component fibers includes side-by-side merging of a plurality of sub-streams of polymers into a combined conjugated stream in a counterbore of a spinneret. As shown in FIG. 1, sub-streams of two incompatible polymers (polymers A and B) are introduced into the counterbore 12 of a spinneret 10 and brought into contact with each other. As used herein in the context of polymers, the term "incompatible" refers to different polymers that do not strongly bond or strongly adhere to each other, but that will cling or somewhat adhere to each other when adjacently extruded in a molten state from a spinneret and, when arranged side-by-side, can later be separated from each other with a limited degree of effort. The adjacent polymer sub-streams form a combined stream that flows through the orifice 13 of the spinneret, and the stream is then quenched to form a spun plural-component fiber.

The most common synthetic textile fibers used in fabrics are made from polymer materials such as nylon (e.g., nylon 66, nylon 6), polyester, polyolefin, and their copolymers. All of these polymers are melt spinnable. Some nonwoven fabrics made from carded or air-laid webs comprise rayon or acrylic fibers.

Many of the nonwoven fabrics made from melt-spinnable polymers are produced using a spunbond process. The term "spunbond" refers to a process of forming a nonwoven fabric or web from thin fibers or filaments produced by extruding molten polymers from orifices of a spinneret. More specifically, as shown in FIG. 2, a plurality of plural-component fibers is extruded through orifices of a spinneret to form a vertically oriented curtain of downwardly moving fibers. The fibers are quenched and then enter an air aspirator 14 positioned below the spinneret, which aspirator introduces a rapidly downward moving air stream produced by compressed air from one or more air aspirating jets. The air stream creates a drawing force on the fibers, causing them to be drawn between the spinneret and the air jet, thereby longitudinally stretching and transversely attenuating the fibers. The drawn fibers exit at the bottom of the jet or jets and are randomly laid on a forming surface 16, such as a moving conveyor belt, to form a continuous nonwoven web of fibers. The web is subsequently bonded using one of several known techniques to form the nonwoven fabric, e.g., by being pressed between a pair of hot calender rolls. Carded or air-laid webs can also be formed from these polymers.

In the case of woven fabrics, the extruded fibers are typically quenched and drawn prior to being wound on a bobbin. Thereafter, in a separate process, a conventional knitting or weaving technique is employed to form a woven fabric from the fibers.

A number of known techniques can be used to separate the individual segments of plural-component fibers prior or subsequent to formation of the fabric. Specifically, fiber segments can be separated by applying mechanical force to the fibers, such as high pressure water or air jets or air turbulence, beating, carding, calendering, or other mechanical working of the fibers. In the case of woven fabrics, the fabric can be brushed or sanded to abroad and separate fibers. Another process for separating segments of plural-component fibers involves applying a hot aqueous solution to the fibers to induce splitting or treating the fibers with chemicals. Specifically, the fibers may be transported through a hot water bath or sprayed with steam or a mixture of steam and air. Other techniques have also been proposed, such as developing a triboelectric charge in at least one of the components and/or applying an external electric field to the fibers. Alternatively, one of the components of the plural-component fibers can be dissolved by a solvent applied to the fiber, such that segments formed of the undissolved component remain.

The required treatment of the fibers in the fabric adds cost to the process and introduces the possibility of damage to the fabric. If chemical treatment is involved, loss of polymer results in certain cases, and the additional problem of recycling, disposal and handling of the chemicals exists. Moreover, limited or incomplete fiber splitting may result, depending on the particular polymers, the extrusion process, and the splitting technique applied. In particular, the extent of fiber splitting may be limited at higher spinning and web formation belt speeds, thereby constraining the rate at which the nonwoven fabric can be produced. These problems can be mitigated by forming plural-component fibers that are easily splittable.

It has been found by the present inventor that easier splitting of a bicomponent fiber comprising two adjacent segments formed of incompatible polymers can be achieved by keeping the polymer sub-streams separated from each other in the spinneret and merging the side-by-side sub-streams into a combined stream just below the face of spinneret from which the sub-streams are extruded via two separate orifices. As described in U.S. Pat. No. 5,093,061 (the '061 patent), the disclosure of which is incorporated herein by reference in its entirety, by combining the sub-streams only after the sub-streams have been extruded, the adhesion between the sub-fibers is sufficiently light that the fiber splits substantially completely into the sub-fiber segments upon application of boiling water.

While the aforementioned patent discloses the technique of combining two streams below the spinneret to form an easily splittable bicomponent fiber, the process described therein has a number of limitations. Specifically, the process is limited to an arrangement wherein two sub-streams are aimed directly toward each other (i.e., the sub-streams are directed along axes that intersect, the axes being co-planar in a vertical plane), such that substantial surface areas of the sub-streams come into contact with each other at the point of sub-stream intersection to produce a side-by-side two-segment fiber.

The geometry (i.e., co-planar intersecting axes) of that system is not readily extendable to production of multi-component fibers. In particular, the technique disclosed in the '061 patent cannot be used to generate plural-component fibers having an elongated or ribbon-shaped transverse cross-section with three or more sub-fibers or segments, since the polymer streams merge at a common point. Further, while the degree of sub-fiber adherence is reduced by joining the polymer sub-streams below the spinneret, the centerline intersection of the sub-streams causes the sub-fibers to contact and adhere to each other over a substantial portion of their surface areas, thereby forming a significant bond.

Moreover, the system disclosed in the '061 patent involves winding the two-segment fiber onto a package immediately after quenching of the fiber without splitting the fiber. The unsplit fiber is subsequently woven or knitted, and split only when the resulting woven fabric is subjected to boiling water in a scouring and dying process. It is desirable that the sub-fibers of the two-segment fibers be sufficiently bonded to each other to avoid separation during the winding, handling and weaving processes that occur prior to the dying process. Thus, the '061 patent does not suggest fiber splitting in the context of spunbond or non-woven fabric formation, where splitting in line with fiber extrusion is desirable.

Acordingly, there remains a need for a system capable of producing easily splittable plural-component fiber useful for in-line fiber splitting in a simple, inexpensive and rapid spunbond process to form nonwoven fabrics having a fine denier and good fabric characteristics.

SUMMARY OF THE INVENTION

It is an object of the present invention to produce plural-component synthetic fibers whose constituent sub-fibers or segments are easily separated from each other, which fibers are useful for forming woven and nonwoven fabrics.

It is another object of the present invention to minimize the contact surface area between adjacent segments of a plural-component fiber to improve the separability of the segments.

It is another object of the present invention to produce plural-component fibers having a high aspect ratio, such as ribbon-shaped fibers, to improve process efficiency and fabric quality.

It is a further object of the present invention to achieve a high degree of separation between segments of plural-component fibers in an in-line spunbond process to produce a nonwoven fabric having a fine denier.

It is a still further object of the present invention to rapidly separate constituent fiber segments of plural-component fibers in an in-line spunbond process using a relatively simple, reliable and inexpensive mechanism.

It is another object of the present invention to produce a nonwoven fabric having superior properties, such as good coverage (i.e., no openings or gaps), bulkiness, softness, flexibility and drape, and good barrier properties.

It is yet another object of the present invention to form a fiber web that can more readily be bonded to form nonwoven fabric.

The aforesaid objects are achieved individually and in combination, and it is not intended that the present invention be construed as requiring two or more of the objects to be combined unless expressly required by the claims attached hereto.

According to the present invention, easily splittable plural-component synthetic fibers are formed by separately extruding individual molten polymer streams from orifices of a spinneret and joining the extruded polymer streams below the downstream face of the spinneret. The polymer streams are merged into a combined polymer stream by extruding the polymer streams in directions that cause surfaces of the streams to contact each other and adhere. The relative position of the orifices from which the polymer streams are extruded, the number of orifices, and the direction of extrusion of the individual streams determine the overall transverse cross-sectional shape of the resulting plural-component fiber. The centerlines of the extruded polymer streams are offset (i.e., non-intersecting) with each other, such that surfaces of adjacent streams contact each other in a somewhat tangential or glancing manner, thereby minimizing the surface area of each polymer stream that adheres to adjacent streams to facilitate subsequent easy separation of the fiber segments formed by the quenched streams.

According to an exemplary embodiment, a spinneret for producing easily splittable plural-component fibers includes two separate slot-shaped passages for respectively delivering two incompatible polymers (polymers A and B) to two sets of inclined capillaries. The two sets of capillaries converge toward each other in a downstream direction and direct molten polymer streams to two respective rows of orifices. The centerlines of polymer A capillaries lie along axes that, when extended beyond the spinneret, are offset and non-intersecting with axes along which the centerlines of the polymer B capillaries lie. Accordingly, in the direction of the rows of the orifices, the centers of the polymer A orifices are offset with respect to the centers of the polymer B orifices.

Polymers A and B are simultaneously extruded from their respective orifices at substantially the same speed in directions dictated by the angle and orientation of their respective capillaries. Consequently, the centerlines of the extruded polymer A streams are directed along axes that are non-intersecting with the axes along which the centerlines of the extruded polymer B streams are directed. The inclined angle of the capillaries and the arrangement of the orifices cause the extruded streams of polymers A and B to extend toward each other along offset centerline axes with the polymer A streams being directed between the polymer B streams in an interleaved fashion. The spacing between the orifices is set such that the polymer A and B streams contact each other in a generally tangential, glancing or grazing manner. More specifically, to ensure that the interleaved extruded streams of polymers A and B contact and adhere to each other to merge into a combined stream below the face of the spinneret, the distance b between the centerlines of adjacent same-polymer orifices is less than the sum of the polymer A orifice diameter and the polymer B orifice diameter.

The interleaved polymer streams contact each other to form a combined stream. The combined stream then proceeds substantially vertically downward and is subjected to a quenching process. By joining the polymer streams below the spinneret, adjacent segments of the resulting plural-component fiber are less strongly bonded to each other than they would otherwise be if joined within the spinneret and extruded from a single orifice. The offset arrangement of the orifices reduces the strength of the bond between adjacent fiber segments by limiting the surface area over which the segments are in contact with each other in the resulting plural-component fiber. The bond formed between adjacent segments of the plural-component fibers is sufficiently strong to withstand attenuation of the fibers without substantial separation, but sufficiently weak to allow separation with only a modest amount of separation processing.

Once quenched, the easily splittable plural-component fibers can be used to form a woven or non-woven fabric using any of a variety of fabric forming technologies. Likewise, the plural-component fibers can be separated using any one or a combination of known fiber-splitting techniques, including: mechanical working with high pressure water or air jets or air turbulence, beating, carding, calendering, and application of a hot aqueous solution, hot air and/or steam. In accordance with one embodiment of the present invention, in-line splitting of the plural-component fibers is accomplished using differential heat shrinkage in a spunbond process for forming nonwoven fabric.

The present invention is not limited to use of easily splittable plural-component fibers in nonwoven fabrics formed from spunbond process and encompasses processes for forming fabric from plural-component fibers that do not require bonding of the fibers (e.g., spun-laid or air carding processes). Further, the present invention can be applied in melt blown systems. The benefits of using easily splittable plural-component fibers are not limited to systems that form webs from fiber filaments (i.e., continuous fibers), and the present invention encompasses processes for forming woven and nonwoven fabrics from split or splittable staple fibers.

Further, formation of easily splittable plural-component fibers in accordance with the present invention can be performed in conjunction with other extrusion and fabric or material formation techniques. For example, both splittable and non-splittable fibers can be extruded from a single spinneret or plural spinnerets to create a web having a mixture of different types of fiber or fiber shapes. Further, a web formed from separated sub-fibers can be coupled to (e.g., bonded to) other types of webs or laminates in, for example, a multi-layered product.

The nonwoven fabric formed by the process of the present invention is useful in any product where properties such as softness, strength, filtration or fluid barrier properties, and high coverage at a low fabric weight are desirable or advantageous, including, but not limited to: disposable absorbent articles; medical barrier fabrics; filtration media; and clothing liners.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

In accordance with the present invention, easily splittable plural-component synthetic fibers are formed by separately extruding individual molten polymer streams from orifices of a spinneret and joining the extruded streams external to the spinneret to form combined streams that are quenched to produce plural-component fibers. Merging of the polymer streams into a combined stream is achieved by extruding the polymer streams in directions that cause surfaces of the streams to contact each other and adhere. The relative positions of the orifices from which the fiber streams are extruded, the number of orifices, and the direction of extrusion of the individual streams determine the overall transverse cross-sectional shape of the resulting plural-component fiber. Upon quenching, the combined stream forms a plural-component fiber, with the individual polymer streams forming the separable segments of the plural-component fiber. Preferably, the centerlines of the extruded fiber streams are offset (i.e., non-intersecting) from each other, such that surfaces of adjacent streams contact each other in a somewhat tangential manner, thereby allowing a wide variety of transverse cross-sectional shapes to be produced, and minimizing the surface area of each stream that adheres to adjacent streams to facilitate easy separation of the fiber segments during subsequent processing.

As used herein, the terms "segment" and "sub-fiber" refer to a portion of a fiber having a composition that is distinct from the composition of another portion of the fiber, and the term "bicomponent" refers to a fiber having two or more segments, wherein at least one of the segments comprises one material or component (e.g., a polymer), and the remaining segments comprise another, different material or component. The term "plural-component", as used herein, refers to a fiber having two or more segments, wherein each segment comprises one of at least two different materials or components which make up the fiber (thus, a bicomponent fiber is a type of plural-component fiber).

Figure 1:
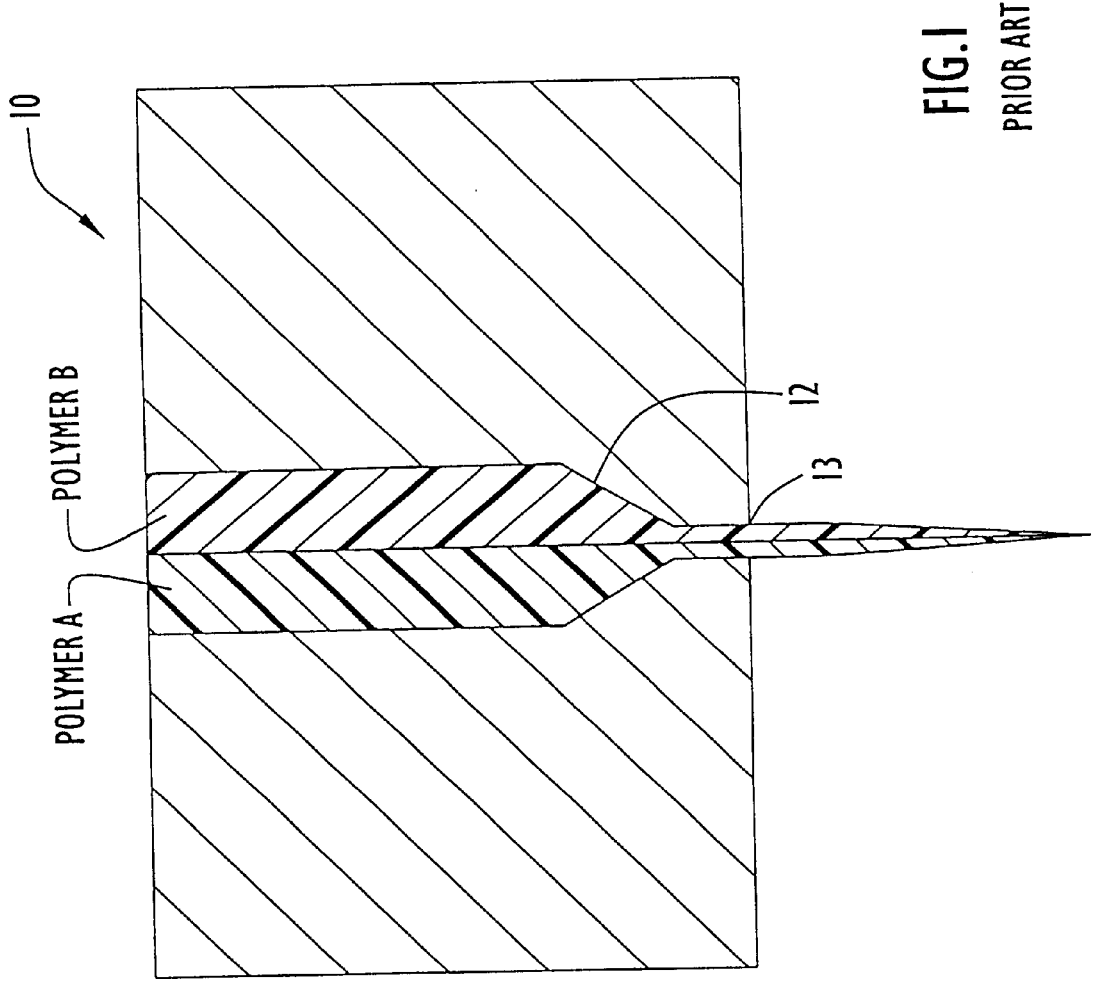
FIG. 1 is a cross-sectional side view in elevation of a conventional spinneret for producing a side-by-side bicomponent fiber.
Figure 2:
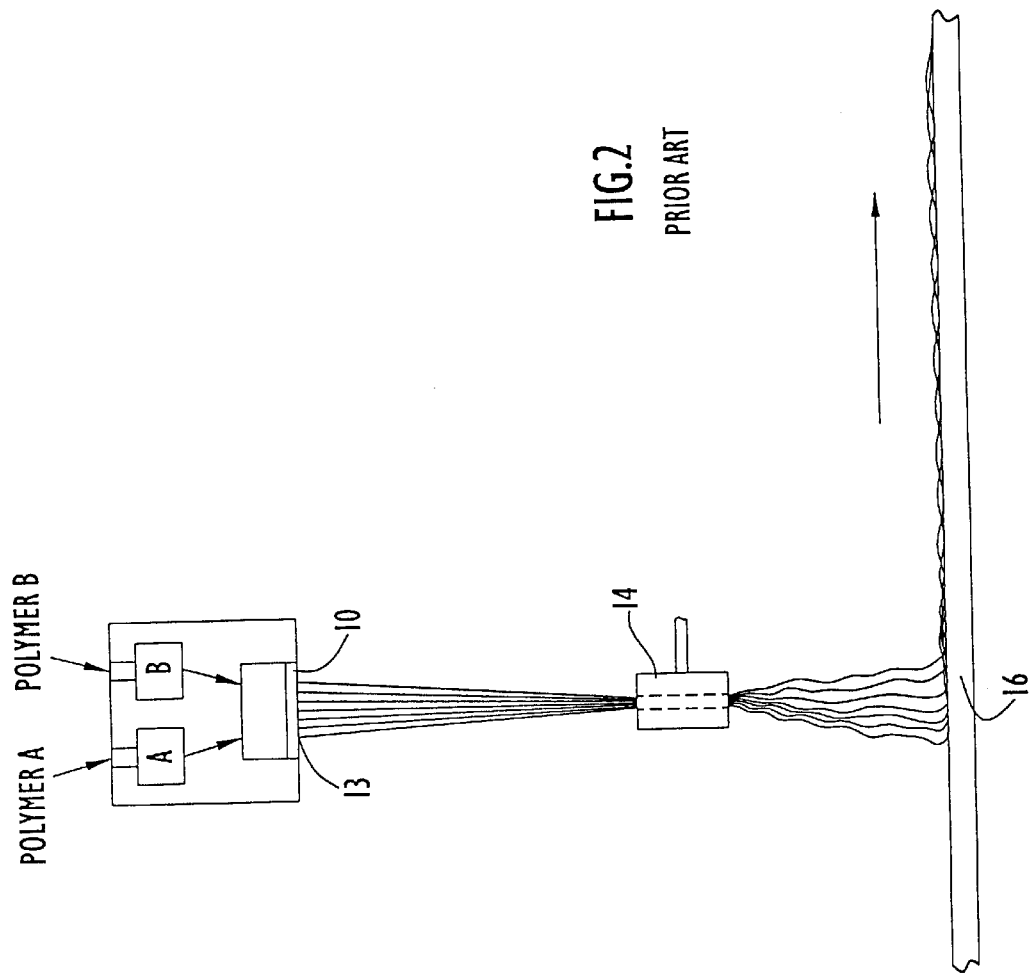
FIG. 2 is a diagrammatic view of an apparatus for performing a conventional spunbond process for forming nonwoven fabric from a plurality of melt spun plural-component fibers.
Figure 3:
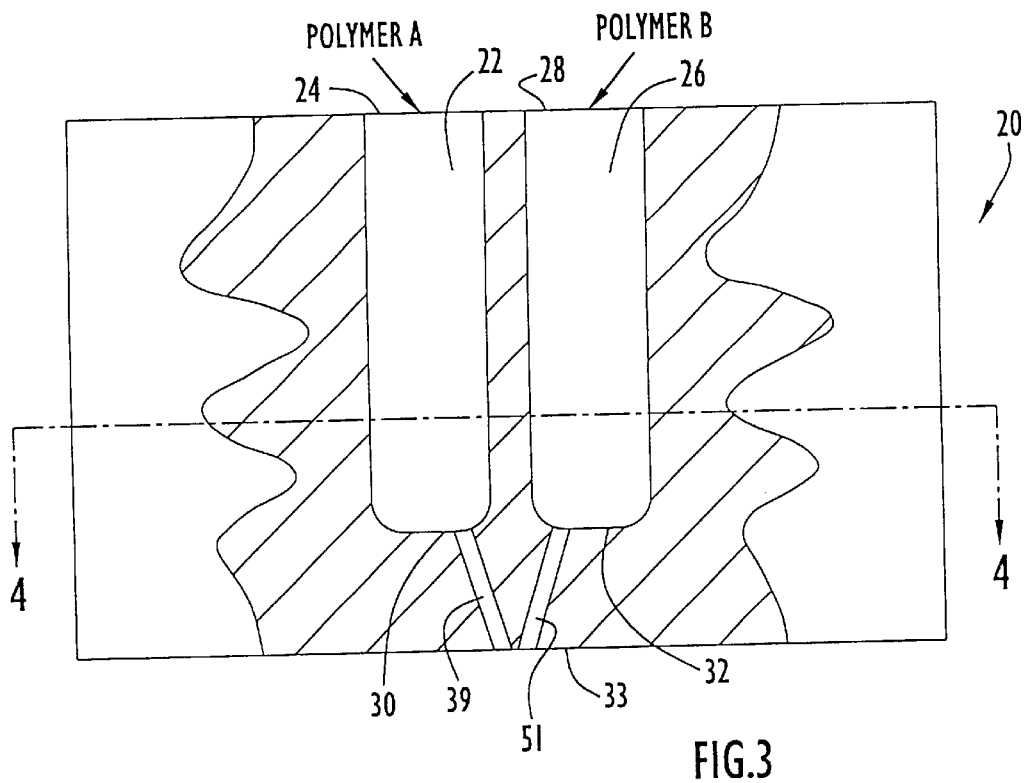
FIG. 3 is a cross-sectional side view in elevation taken along lines 3—3 of FIG. 4 of a spinneret for producing a ribbon-shaped fiber in accordance with a preferred embodiment of the present invention.
Figure 4:
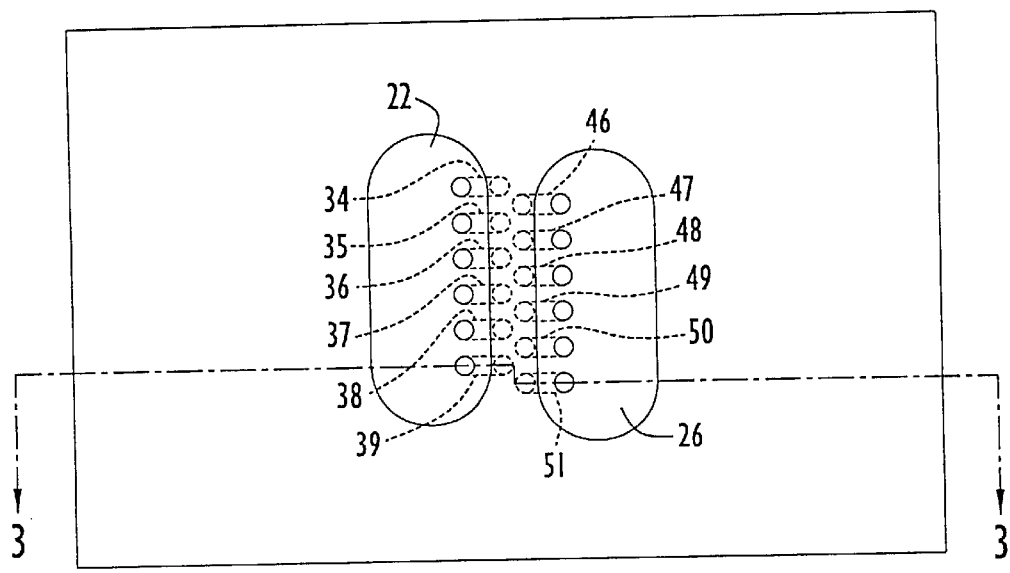
FIG. 4 is a cross-sectional top plan view taken along lines 4—4 of FIG. 3 of the spinneret shown in FIG. 3.
Figure 5:
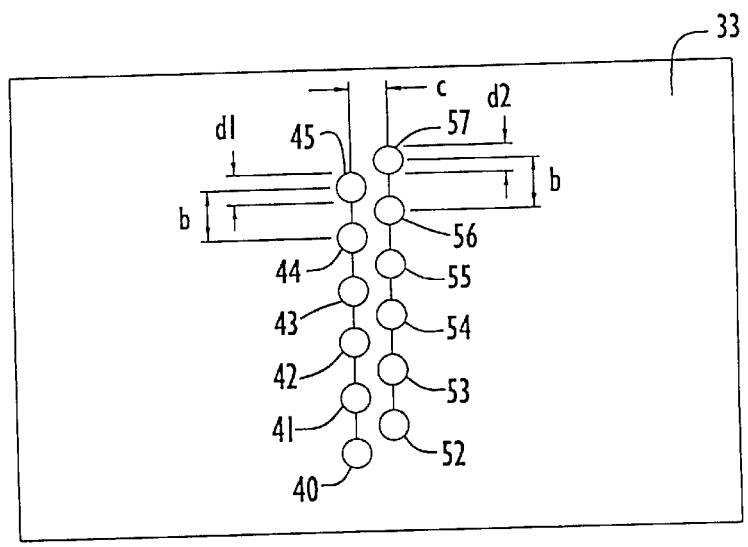
FIG. 5 is a bottom plan view of the spinneret shown in FIG. 3.

An exemplary embodiment of a spinneret 20 useful for producing easily splittable plural-component fibers in accordance with the present invention is illustrated in FIGS. 3–5. The spinneret includes a first counterbore or slot-shaped passage 22 having an upstream opening 24 for receiving a stream of a molten polymer A, and a second counterbore or slot-shaped passage 26 having an upstream opening 28 for receiving a stream of a molten polymer B. Polymers A and B are preferably incompatible polymers that will adhere to each other in a molten or semi-molten state, and remain weakly bonded upon quenching, but that do not strongly bond or tend to readily intermix. For example, polymers A and B can comprise any combination of melt spinnable resins, including, but not limited to: homopolymer and copolymers of polypropylene, polyethylene (e.g., polyeth-ylene terephthalate), polyester, polyactic acid, nylon and poly(trimethylene terephthalate).

As best seen in FIG. 3, counterbores 22 and 26 extend side-by-side generally vertically from upstream openings 24 and 28 to downstream or bottom end surfaces 30 and 32, respectively, and maintain separate flow paths for polymers A and B. Counterbores 22 and 26 have an elongated or generally slot-shaped cross-section transverse to the direction of polymer flow, with the longer transverse sides of counterbores 22 and 26 extending side-by-side within spinneret 20 (see FIG. 4).

A row of inclined, substantially cylindrical capillaries 34–39 extend from the downstream surface of counterbore 22 to a row of respective circular orifices 40–45 in a downstream (bottom) surface 33 of spinneret 10. More specifically, a row of six circular holes in the downstream surface 30 of counterbore 22 define upstream openings of capillaries 34–39 and extend in a line parallel to the longer transverse side of counterbore 22. A parallel row of six circular holes formed in downstream surface 32 of counterbore 24 respectively define upstream openings of another row of inclined, substantially cylindrical capillaries 46–51 which extend from counterbore 24 to a row of respective circular orifices 52–57 in the downstream face of spinneret 20.

The centerlines of capillaries 34–39 are substantially parallel to each other, and the centerlines of capillaries 46–51 are substantially parallel to each other. Capillaries 34–39 and capillaries 46–51 are inclined in a downstream direction toward a vertical centerline lying between counterbores 22 and 24, such that the distance between the two rows of capillaries decreases in a downstream direction from the counterbores to the orifices. Stated differently, the two rows of capillaries 34–39 and 46–51 converge toward each other as they approach the downstream orifices. At least in the vicinity of the orifices, the centerlines of capillaries 34–39 lie along axes that, when extended beyond the spinneret, are offset and non-intersecting with axes along which the centerlines of capillaries 46–51 lie.

As best seen in FIG. 5, orifices 40–45 are positioned at regular intervals along a first line, with centers of adjacent orifices spaced apart by a distance b. Orifices 52–57 are positioned at regular intervals along a second line that is parallel to the first line, with centers of adjacent orifices spaced apart by distance b. The first and second lines extending through the centers of the two rows of orifices are spaced apart by a distance c. Each of orifices 40–45 has a diameter d1, and each of orifices 52–57 has a diameter d2. In the direction of the first and second lines, the centers of orifices 40–45 are offset with respect to the centers of orifices 52–57, such that each of orifices 41–45 is substantially centered (in the direction of the lines) between adjacent pairs of orifices 52–57, and each of orifices 52–56 is substantially centered (in the direction of the lines) between adjacent pairs of orifices 40–45.

As molten polymer streams A and B respectively flow to the downstream surfaces 30 and 32 of counterbores 22 and 24, the polymer streams simultaneously enter the two rows of capillaries and flow downstream toward the two rows of orifices. Each of the polymer streams is extruded from its respective orifice in a direction dictated by the angle and orientation of the capillary. Thus, at the point of extrusion from the orifice, each polymer stream is directed substantially along the axis of the centerline of its capillary. Consequently, the centerlines of the extruded polymer A streams are directed along axes that are non-intersecting with the axes along which the centerlines of the extruded polymer B streams are directed. However, the centerline axes of the polymer A streams lie in a plane that intersects a plane in which the centerline axes of the polymer B streams lie, with the planes intersecting along a substantially horizontal line below the downstream face of the spinneret (hereinafter denoted as "the line of convergence"). The inclined angle of the capillaries, the distance c between the rows of orifices, and the relative positions of the orifices are arranged such that the extruded streams of polymers A and B extend toward each other along offset centerline axes. That is, the polymer A streams extruded from orifices 30–35 are not aimed directly toward the polymer B streams extruded from orifices 42–47; rather, the polymer A streams are directed between the polymer B streams in an interleaved fashion.

The spacing between the orifices is set such that the polymer A and B streams contact each other in a generally tangential manner. More specifically, to ensure that the interleaved extruded streams of polymers A and B contact and adhere to each other to merge into a combined stream below the face of the spinneret, the distance b between two adjacent polymer A orifices 40–45 (also the distance b between two adjacent polymer B orifices 52–57) must be less than the sum of the polymer A orifice diameter d1 and the polymer B orifice diameter d2 (b<d1+d2). However, to minimize the amount of surface area over which adjacent stream contact (and hence the amount of surface area over which segments of the plural-component fiber adhere), it is preferable that the distance b be as close as possible to the sum of the diameters d1 and d2 while still achieving consistent adherence of adjacent streams. As a result, adjacent streams contact each other in a substantially grazing or glancing manner.

The interleaved polymer streams contact each other substantially along the horizontal line of convergence between the aforementioned axial planes to form a combined stream. The combined stream then proceeds substantially vertically downward and is subjected to a quenching process. By joining the polymer streams below the spinneret, adjacent segments of the resulting plural-component fiber are less strongly bonded to each other than they would otherwise be if joined within the spinneret and extruded from a single orifice. This may be due in part to the fact that some degree of cooling or quenching of the polymer streams occurs prior to merging of the streams below the spinneret, with the semi-molten streams having less tendency to bond to each other than molten streams within the spinneret. Further, the individual polymer streams have less surface energy when joined outside the spinneret and are not compressed together as they would be if joined within the spinneret, resulting in weaker inter-stream bonds. Another factor reducing the strength of the bond between adjacent fiber segments is the limited surface area over which the segments are in contact with each other as a result of the offset arrangement of the orifices. The bond formed between adjacent segments of the plural-component fibers is sufficiently strong to withstand attenuation of the fibers without substantial separation, but sufficiently weak to allow separation with only a modest amount of separation processing.

The angle of convergence between the extruded polymer A streams and the extruded polymer B streams (i.e., angle formed between two sets of capillaries) can be any angle that causes the streams to merge at a short distance (e.g., no more than several millimeters) below the lower face of the spinneret. For example, the angle of convergence can be between approximately 20° and 30°. The distance c between the first line along the polymer A orifices lie and the second line along which the polymer B orifices lie is set in conjunction with the angle of convergence to control the distance between the spinneret face and the line of convergence. For example, the distance c can be on the order of the spacing b between adjacent same-type polymer orifices. The orifice diameters d1 and d2 are preferably less than approximately 0.3 mm in diameter, more preferably less than approximately 0.2 mm diameter and, for certain applications, preferably less than approximately 0.1 mm. It is to be understood that these dimensions are provided by way of example only and are not in any way limiting on the scope of the invention unless specifically required by the appended claims.

To facilitate smooth formation of plural-component fibers, the streams of molten polymer A are extruded at substantially the same speed as the streams of molten polymer B. If necessary, the diameter d1 of the polymer A orifices 40–45 may be different from the diameter d2 of the polymer B orifices 52–57 to yield substantially equal polymer extrusion speeds. Further, the diameters d1 and d2 can be set to different values in accordance with a desired volume ratio of polymers A and B in the resulting plural-component fiber. For example, when the desired A:B volume ratio is 1:1, diameter d1 is set equal to diameter d2. For circular orifices, where the desired volume ratio is n:1, the diameter ratio is set to $n^{1/2}$:1. More generally, for any shape of orifice, when the desired A:B volume ratio of the plural-component fiber is n:1, the ratio of the areas of the orifices is set to n:1.

Figures 6, 7, 8, 9:
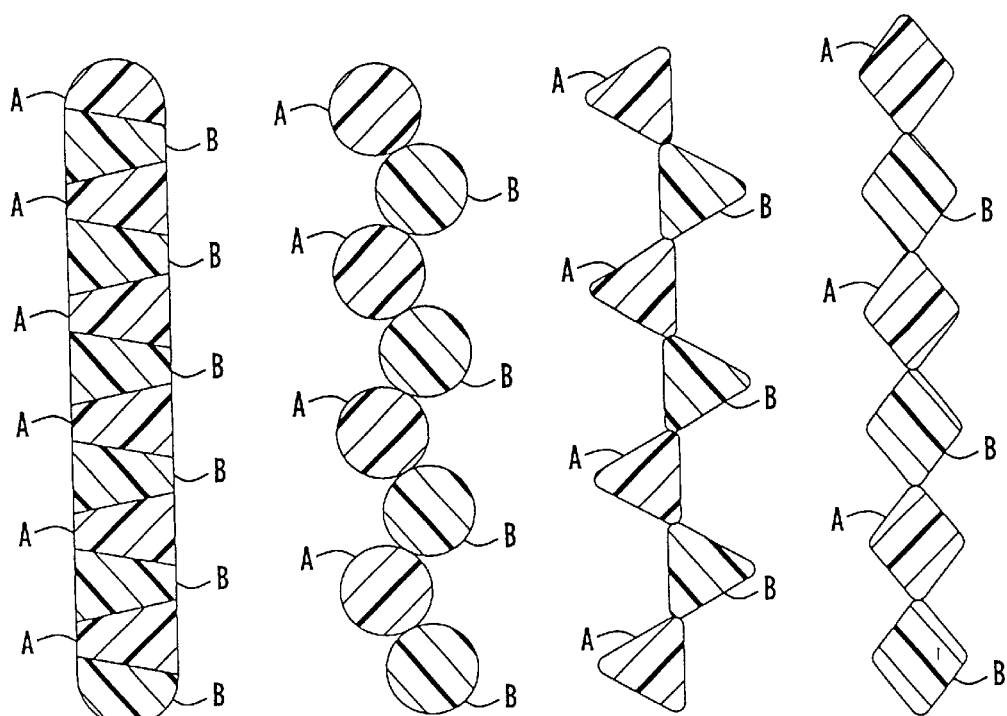
FIG. 6 is a transverse cross-sectional view of an extruded plural-component fiber of the present invention having a ribbon-shaped transverse cross-section produced with a spinneret of the type shown in FIGS. 3–5.
FIG. 7 is a transverse cross-sectional view of another extruded plural-component fiber of the present invention having a ribbon-shaped transverse cross-section produced with a spinneret of the type shown in FIGS. 3–5, wherein the extruded polymer stream merge at a greater distance from the spinneret.
FIG. 8 is a transverse cross-sectional view of a further extruded plural-component fiber of the present invention having a ribbon-shaped transverse cross-section, wherein individual fiber segments have a generally triangular transverse cross-sectional shape.
FIG. 9 is a transverse cross-sectional view of still another extruded plural-component fiber of the present invention having a ribbon-shaped transverse cross-section, wherein individual fiber segments have a generally square or diamond-shaped transverse cross-sectional shape.

The arrangement of the spinneret and orifices shown in FIGS. 3–5 produces a ribbon-shaped combined stream which, after being quenched, forms a ribbon-shaped fiber having a substantially straight or flat transverse cross-sectional shape with alternating side-by-side segments of polymers A and B, as shown in FIG. 6. Each segment adjoins adjacent segments along lines extending between the longer edges of the ribbon. The fiber shown in FIG. 6 is formed from streams that converge and merge into a single stream while the polymer streams are still substantially molten, resulting in a substantially smooth surface. If the streams merge at a greater distance below the downstream face of the spinneret, the individual streams have an opportunity to cool slightly prior to merging; consequently, the segments of the resulting plural-component fibers may retain the shape of the individual streams to a greater degree, as shown in transverse cross-section in FIG. 7. As a result, the plural component fiber is formed with a ripple-shaped surface, wherein the segments adhere to each other along a reduced surface area (relative to the fiber shown in FIG. 6) and are easier to separate from each other during subsequent processing.

The formation of splittable ribbon-shaped plural-component fibers provides a number of advantages over plural-component fiber having other transverse cross-sectional shapes. More specifically, ribbon-shaped fibers having an aspect ratio of at least 3.0 (defined as the ratio of the length to width of the transverse cross-section of the fiber) have been found to provide unexpected efficiencies in the fiber drawing process. As described in International Patent Application No. PCT/US98/25627, the disclosure of which is incorporated herein by reference in its entirety, an aspirator is typically employed to draw the fibers after extrusion. The aspirator uses air pressure to form an air flow directed generally downward, which creates a downward air drag on the fibers, thereby increasing the velocity of the portion of the fibers in and below the aspirator relative to the velocity of the portion of the fibers above the aspirator. The downward drawing of the fibers longitudinally stretches and transversely attenuates the fibers. The greater surface area (resulting from a larger transverse perimeter and a high aspect ratio) of each ribbon-shaped fiber allows the downwardly directed air in the aspiration unit to "grip" the fiber better due to increased downward drag on the fibers, hence achieving a fiber velocity closer to the aspirator's downward air velocity. This increased fiber velocity results in fibers of desirably lower denier at a given air pressure and air consumption. Stated in another way, the increased downward drag permits a lower air pressure and air consumption to produce ribbon-shaped fibers having the same denier as low aspect fibers drawn at higher air pressures, hence providing the potential to reduce energy costs.

Moreover, where subsequent splitting of the fiber segments is achieved using differential heat shrinkage of two different polymer components, plural-component fibers having a ribbon-shaped cross-section have been found to provide faster and more complete segment separation relative to plural-component fibers having other transverse cross sectional shapes. Further, when incomplete splitting of the fibers occurs, the ribbon-shaped fiber still results in a very soft fabric relative to other fiber cross-sections, because of the shape of the ribbon produces a very low bending modulus (i.e., the unseparated portions of the ribbon fibers can still twist and bend in three dimensions, and the adjoining separated portion of the fibers have a high degree of freedom to bend in different directions relative to each other). Thus, in accordance with the present invention, use of plural-component fibers having a ribbon-shaped cross section with segments of alternating components is desirable because: 1) they split easily and almost totally; and 2) to the extend that the fiber segments do not separate, the unsplit ribbon-shaped fiber is by far softer than unsplit fibers of other transverse cross sections.

To further reduce the surface area over which adjacent segments of the plural-component fibers are joined, the cross-section of the capillaries and orifices can be other than circular. For example, the capillaries and orifices (and hence the extruded polymer streams) can have substantially triangular transverse cross-sectional shapes, such that the streams contact adjacent streams at edges formed by the triangle points (albeit somewhat rounded at the time of contact), as shown in FIG. 8. Similarly, the orifices can have a square or diamond shape, such that adjacent polymer streams join at the corners of the squares or diamonds, as shown in FIG. 9. Polymers extruded with other regular or irregular transverse cross-sections are suitable for use with the present invention, including, but not limited to, polymer streams having multi-lobal transverse cross sections (e.g., trilobal or star-shaped). These orifice/polymer stream non-circular transverse cross-sectional shapes produce fiber segments that are attached to adjacent segments over a relatively small surface area, allowing individual segments to freely pivot about their attachment points. As a result, ribbon-shaped fibers formed of triangular, diamond-shaped or multi-lobal segments have an even lower bending modulus than comparable ribbon-shaped fibers formed of segments having a circular transverse cross-sectional shape, and consequently form even softer fabrics.

Figure 13:
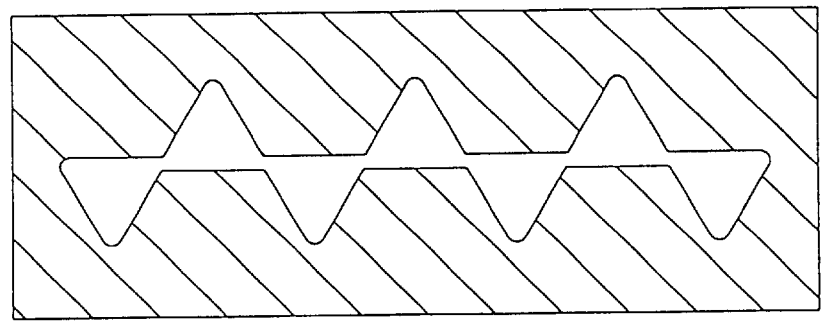
FIG. 13 is a bottom plan view of a spinneret face having an orifice with facing undulating edges for forming a ribbon-shaped plural-component fiber having segments with substantially triangular-shaped transverse cross sections in accordance with still another embodiment of the present invention.
Figure 12:
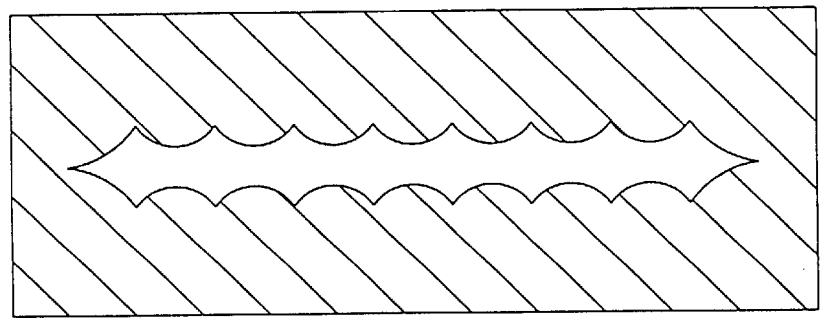
FIG. 12 is a bottom plan view of a spinneret face having an orifice with facing convex arcuate edges for forming a ribbon-shaped plural-component fiber having multi-lobal segments in accordance with yet another embodiment of the present invention.
Figure 11:
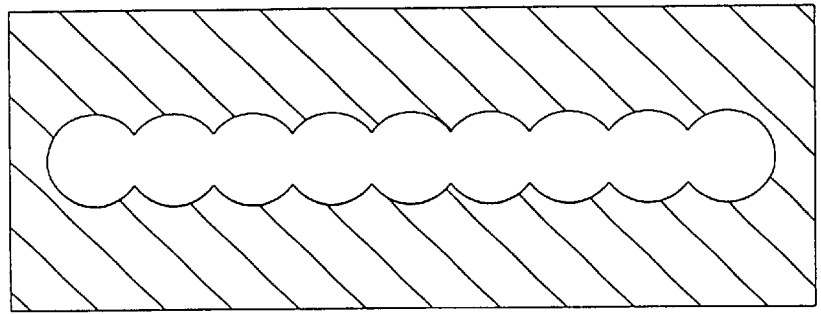
FIG. 11 is a bottom plan view of a spinneret face having an orifice with facing concave arcuate edges for forming a ribbon-shaped plural-component fiber having segments with rounded transverse cross sections in accordance with another embodiment of the present invention.
Figure 10:
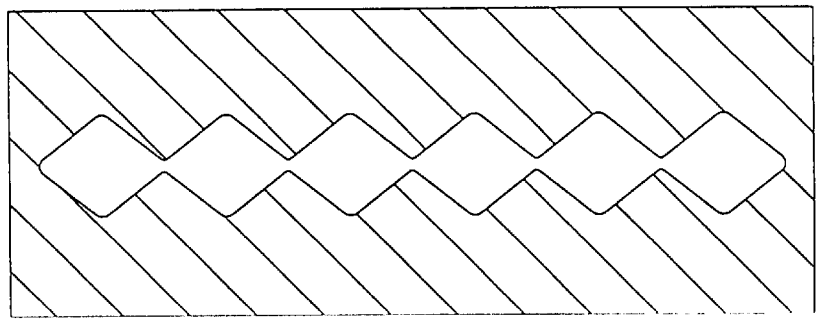
FIG. 10 is a bottom plan view of a spinneret face having an orifice with facing saw-tooth edges for forming a ribbon-shaped plural-component fiber having segments with substantially diamond-shaped transverse cross sections in accordance with one embodiment of the present invention.

In accordance with another aspect of the present invention, plural-component fibers having an elongated transverse cross section and reduced surface area in contact between adjacent segments can be extruded from a single, elongated orifice having facing undulating edges. For example, a ribbon-shaped fiber having diamond-shaped segments can be formed by extruding plural side-by-side polymer streams of interleaved components from an orifice having facing saw-tooth edges (FIG. 10), with each polymer stream being extruded between tips of adjacent teeth. Other segment shapes can be produced from orifices with other undulating shapes, such as facing arcuate sections or facing U-shaped sections (see FIGS. 11–13). In each case, adjacent polymer streams meet at periodic points along the undulating pattern, preferably at points where the orifice has a local minimum transverse width in order to minimize the surface area over which the streams (and segments) contact each other. As used herein, the term "local minimum transverse width" refers to a transverse distance across the orifice that is less than the transverse distance across the orifice to either side. Thus, for example, the opposing pointed tips of the teeth of the saw-tooth edges for a location where the orifice has local minimum transverse width.

While the bonds formed between adjacent segments extruded from a single orifice in this manner are stronger than those formed between comparable segments formed by separate extrusion of the polymer streams, the reduced surface area between adjacent segments results in easier separation of segments and a lower bending modulus (relative to a comparable flat ribbon-shaped plural-component fiber).

Figure 15:
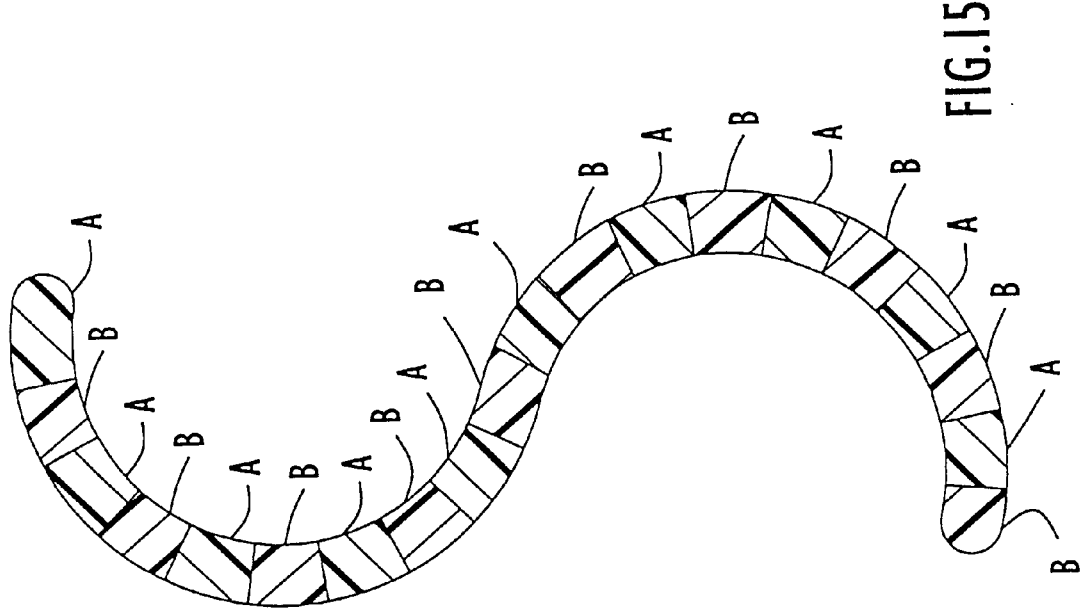
FIG. 15 is a transverse cross-sectional view of an extruded plural-component fiber of the present invention having an S-shaped transverse cross-section.
Figure 14:
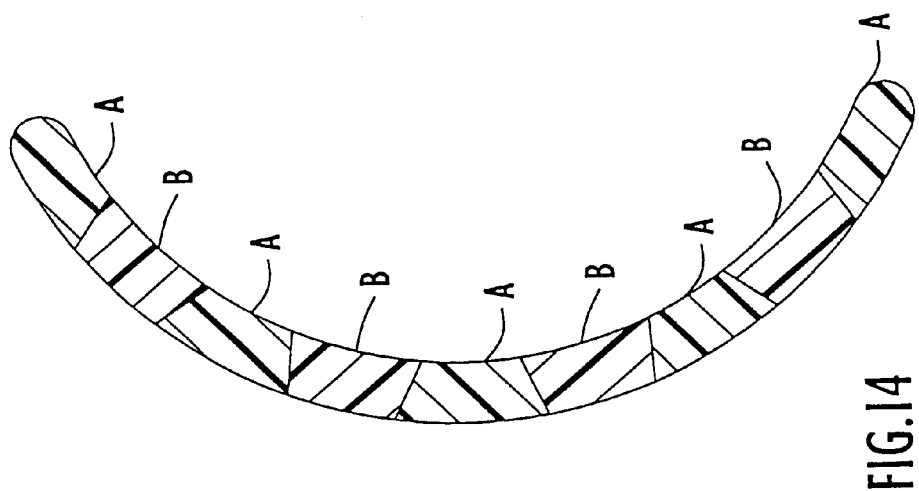
FIG. 14 is a transverse cross-sectional view of yet another extruded plural-component fiber of the present invention having a C-shaped transverse cross-section.

While the exemplary embodiment shown in FIGS. 3–5 produces a ribbon-shaped bicomponent fiber whose transverse cross-section is elongated along a substantially straight line, it will be understood that virtually any desired transverse cross-sectional fiber shape can be achieved by controlling the number of orifices, the relative positions of the orifices, and the angle of convergence of each of the capillaries. For example, by suitably arranging the layout pattern of the orifices, plural-component fibers having curved ribbon-shaped transverse cross sections, such as those shown in FIGS. 14 and 15, can be produced. In other words, the "line of convergence" need not be a line, but can be a curve, and the curve along which the polymer streams merge need not lie in a horizontal plane or be parallel with the downstream face of the spinneret.

Furthermore, in accordance with the present invention any number, combination or arrangement of counterbores, polymer flow paths, capillaries, and orifices can used to produce a plural-component fiber, provided that at least some number of polymer streams are extruded along non-intersecting centerlines and are joined external to the spinneret to form a plural-component fiber. Thus, for example, the capillaries which deliver the polymer streams to the orifices need not be cylindrical, straight, parallel to like-polymer capillaries or lie along a common plane. Further, the polymer streams forming a single plural-component fiber need not join at the same distance from the spinneret. For instance, two streams may merge just below the spinneret, with a third stream joining the two streams at a greater distance from the spinneret.

While shown in the exemplary embodiment as producing a ribbon-shaped plural-component fiber comprising several segments, it will be understood that the principle of the present invention can be applied using as few as two segments, where the centerlines of the two extruded polymer streams lie along non-intersecting axes, such that the two streams contact each other in a somewhat or generally tangential, glancing or grazing manner after extrusion and adhere to each to form a two-segment, bicomponent fiber. Moreover, while the foregoing examples depict bicomponent fibers, it will be understood that the present invention can be applied using three (e.g., polymers A, B and C) or more different polymers interleaved to form an easily splittable multi-component fiber.

The easily splittable plural-component fiber produced in accordance with the present invention can be used in a spunbond process to produce a non-woven fabric having desirable properties. For example, the plural-component fiber extrusion technique of the present invention can be used in conjunction with the in-line fiber splitting spunbond system disclosed in International Patent Application No. PCT/US98/21378, the disclosure of which is incorporated herein by reference in its entirety. The term "in-line", as used herein refers to a process wherein fiber extrusion, splitting and web formation are performed in a single, continuous process (i.e., not in-line would be if the extruded fibers are made into a roll and then split or formed into a web separately).

Figure 16:
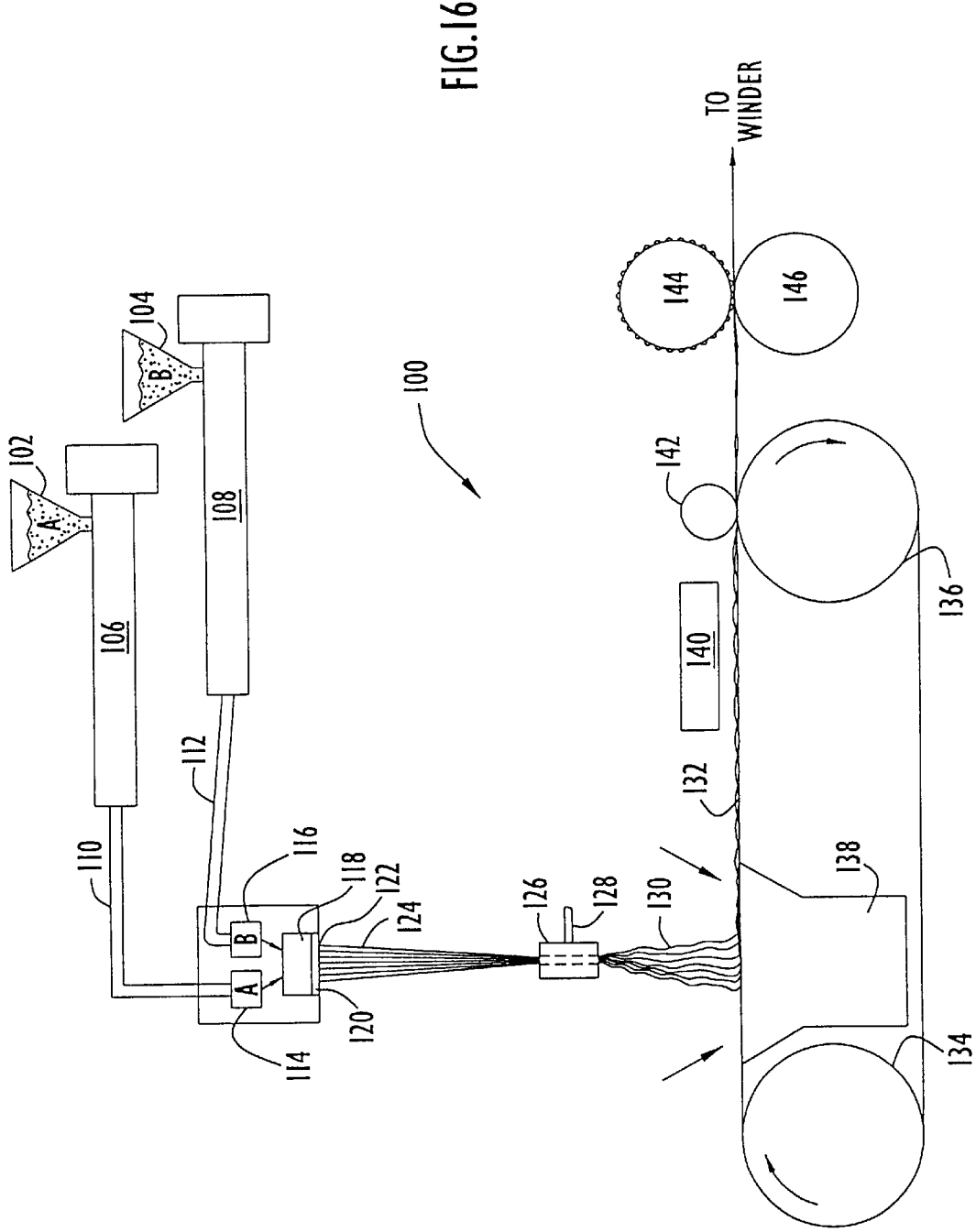
FIG. 16 is a diagrammatic view of an apparatus for performing a spunbond process employing fiber splitting in line with fiber extrusion to form a nonwoven fabric.

FIG. 16 diagrammatically illustrates an apparatus 100 for producing a nonwoven fabric according to an in-line spunbond process. Apparatus 100 includes hoppers 102 and 104 into which pellets of two different polymers, polymers A and B, are respectively placed. Polymers A and B are respectively fed from hoppers 102 and 104 to screw extruders 106 and 108 which melt the polymers. The molten polymers respectively flow through heated pipes 110 and 112 to metering pumps 114 and 116, which in turn feed the two polymer streams to a suitable spin pack 118. Spin pack 118 includes a spinneret 120 with orifices 122 for producing easily splittable plural-component fibers in the aforementioned manner. By way of non-limiting example, orifices 122 may be arranged to extrude a substantially horizontal, rectangular array of plural-component fibers.

As used herein, the term "spin pack" refers to the entire assembly for processing the molten polymer to produce extruded polymer streams, including the polymer filtration, mixing and distribution systems and the spinneret. As used herein, the term "spinneret" refers to the portion of the spin pack which delivers the molten polymer to and through orifices for extrusion into the environment. The spinneret can be implemented with drilled holes through a plate or any other structure capable of issuing the required fiber streams.

An array of plural-component fibers 124 is formed from the polymer streams exiting the spinneret 120 of spin pack 118 and is pulled downward and attenuated by an aspirator 126 which is fed by compressed air or steam from pipe 128. Aspirator 126 can be, for example, of the gun type or of the slot type, extending across the full width of the fiber array, i.e., in the direction corresponding to the width of the web to be formed by the fibers. A typical spinneret and aspirator arrangement useful for this process is illustrated in U.S. Pat. No. 3,802,817, the disclosure of which is incorporated herein by reference in its entirety.

Aspirator 126 delivers attenuated fibers 130 onto a web-forming screen belt 132 which is supported and driven by rolls 134 and 136. A suction box 138 is connected to a fan (not shown) to pull room air (at the ambient temperature) through screen belt 132 and cause fibers 130 to form a nonwoven web on screen 132.

Once the web is formed on screen 132, the web is treated to cause the plural-component fibers to separate into their constituent segments. For example, where the polymers of the fibers shrink to different degrees upon application of heat, the web can be heated to cause differential heat shrinkage of the two (or more) polymer materials of the fibers. Specifically, when heated to a temperature below their melting points, one of the polymers (e.g., polymer B) shrinks, relative to its unheated size, more than the other polymer (e.g., polymer A) shrinks relative to its unheated size. When the difference in heat shrinkage is significant, crimping and separation of the fiber segments occurs. A high degree of crimping and splitting (separation) of the plural-component fibers is desirable, since a lofty or bulky non-woven fabric having good softness, flexibility and drape characteristics and barrier properties results. One particularly advantageous combination of polymers is polypropylene (polymer A) and polyethylene terepthalate (PET) modified with 20 mole percent purified isopthalic acid and a powdered transesterification inhibitor (GE Ultranox 626) (polymer B), which have a difference in heat shrinkage of approximately thirty percent under the heating conditions of the present invention.

Referring again to FIG. 16, to differentially heat shrink the plural-component fibers, the web formed on web-forming belt 132 passes in close proximity to (e.g., directly under or over) a heating unit 140 which causes the temperature of the fibers of the web to increase to a temperature at which differential heat shrinkage of polymers A and B occurs, thereby causing the plural-component fibers to separate into their constituent segments. That is, the temperature of the web is raised to a temperature below the melting points of polymer A and polymer B but high enough to sufficiently shrink at least one of the two polymers to cause separation between adjacent segments of the fibers. As used herein, the terms "separation" and "separate" connote substantial detachment of segments from adjacent segments along at least a substantial portion of the longitudinal extent of the segments, but do not require total separation (although total separation or nearly total separation is desirable and can be achieved with certain polymer and process combinations).

Although substantial crimping of the fibers is not required by the present invention, some crimping of the fibers may occur in addition to fiber splitting to further increase the softness and bulkiness of the fabric. For example, some degree of crimping of the fiber segments typically occurs at the time of initial shrinkage, the segments of the unseparated portions of the fibers experience significant crimping due to the shrinkage difference between the unseparated segments, and the segments of the separated portions of the fibers may also experience some degree of crimping, depending on the particular polymer components and the process conditions.

Heating unit 140 can supply any type of heat suitable for causing differential heat shrinkage and separation of the fiber components, including, but not limited to: hot air blown through the web (convection heating); steam blown through the web; radiant heat; and combinations thereof. Heat can also be applied by subjecting the web to hot or boiling water. Other techniques can be used instead or in combination with heating to separate the plural-component fibers, including, but not limited to, treatment with chemicals, applying mechanical force to the fibers, such as high pressure water jets, beating, carding, calendering, or other mechanical working of the fibers. Alternatively, one of the components of the plural-component fibers can be dissolved by a solvent applied to the fiber, such that segments formed of the undissolved component remain.

Referring once again to FIG. 16, after separation of the plural-component fibers, the web passes through an optional compaction roll 142 and then leaves the screen and passes through a nip formed by heated calender rolls 144 and 146. One of the calender rolls is embossed to have raised nodules which fuse the fibers together only at the points where the nodules contact the web, leaving the fibers between the bond points still bulky and giving the resultant bonded nonwoven fabric good flexibility and drape. Other conventional bonding techniques can be employed to bond the web, including, but not limited to: through-air bonding (particularly useful with the low melt temperature normally seen with high shrinkage components); needle punching; and hydroentangling (i.e., use of high-pressure water jets). In particular, in accordance with the through-air bonding technique, as heat is applied to the web, the temperature of the web rises to a point at which differential shrinkage of the high-shrinkage polymer component occurs. As heat continues to be applied, the temperature of the web rises to a temperature to a point at which the high-shrinkage polymer becomes tacky and begins to melt, allowing the segments formed of high-shrinkage polymer to bond to adjacent polymers.

While formation of a nonwoven fabric has been described in the context of a spunbond process, the easily splittable plural-component fibers of the present invention can be employed in web or fabric forming processes that do not require bonding of the fibers. For example, the differential heat shrinkage technique can be applied in spunlaid processes.

Furthermore, the easily splittable plural-component fibers of the present invention can be used to form woven fabrics. In this case, the extruded and drawn plural-component fibers are wound on a bobbin or other winding mechanism. Subsequently, the fibers are used in a conventional knitting or weaving process to form a woven fabric. The plural-component fibers can be split by employing one of the aforementioned splitting techniques or by brushing or sanding the fabric.

The process of forming fabric from the plural-component fibers of the present invention is not limited to the particular apparatus and processes described in connection with FIG. 16, and additional or modified processing techniques are considered to be within the scope of the invention. For example, one or more godets may be used prior to the aspirator for drawing and/or relaxing the fibers. A downstream godet may be operated at higher speed than an upstream godet to stretch the fibers, or a downstream godet may be operated at a lower speed than an upstream godet to relax the fibers.

While the above-described embodiments of forming a nonwoven fabric rely principally on separation of the plural-component fibers of the web after deposition of the plural-component fibers on the web-forming surface, in accordance with the present invention, measures may be taken to effect fiber splitting prior to deposition of the fibers onto the web-forming surface. Techniques which result in splitting or partial splitting of the fibers before laydown on the web-forming belt may result in a fabric with better coverage (free of open areas in the web) as well as the other advantageous fabric qualities described herein, as the fiber segments are able to lay down on the belt independently of each other. Specifically, the aforementioned godet(s) may be heated to assist in differential heat shrinkage of the fibers to facilitate splitting, and/or another conductive heating device, such as a hot plate, can be employed for this purpose.

Various splitting aids can also be employed, including, but not limited to: fluoropolymer or silicone compounds in one or more of the polymer components to make the components slippery and more prone to split; foaming agents in one or more of the components which induce swelling of one component relative to the other component; and use of ultrasonics in addition to heat to excite the two polymer components to enhance relative movement and splitting.

The fine fiber segments separated by the system of the present invention produce a desirably softer fabric with greater loftiness and bulkiness than nonwoven fabrics made from known spunbond processes. Various additional improved fabric properties, such as good fabric drape, high filtration, barrier properties, and coverage at low weight are also achieved with the ultra-low denier per filament resulting from the split fibers of the present invention.

Fabrics formed from the easily splittable plural-component fibers produced by the process of the present invention are useful in any product where properties such as softness, strength, filtration or fluid barrier properties, and high coverage at a low fabric weight are desirable or advantageous. For example, the fabric of the present invention can be used in a variety of commercial products including, but not limited to: softer diaper liners, sanitary napkins, disposable wipes or other disposable absorbent articles; medical fabrics having barrier properties such as surgical gowns and drapes and sterilization wraps; filtration media and devices; and liners for articles of clothing (e.g., a liner of a jacket). The easily splittable plural-component fibers of the present invention are also suitable in any product where a fluffy nonwoven fabric is useful, such as thin sheets of padding.

The present invention is not limited to the particular apparatus and processes described above, and additional or modified processing techniques are considered to be within the scope of the invention. For example, while described in the context of a spunbond process, the easily splittable plural-component fibers of the present invention can be use in web or fabric forming processes that do not require bonding of the fibers. For example applied in spun-laid or air carding processes. Further, the present invention can be applied in melt blown systems.

Moreover, the benefits of using separated sub-fibers are not limited to systems that form webs from continuous fibers. Thus, for example, the present invention encompasses processes for forming nonwoven fabrics from staple sub-fibers, wherein the fibers are cut into short fibers prior to forming a web therefrom (either prior or subsequent to fiber splitting). One potential advantage of employing staple fibers is that, a more isotropic fabric can be formed, since the staple fibers potentially can be oriented in the web more randomly than continuous fibers.

In addition to nonwoven webs and fabrics composed solely of separated sub-fibers from plural-component fibers, the plural-component fibers of the present invention can be used in combination with fibers of other transverse cross sections and in combination with other technologies to form composite materials. For example, other sheet technologies, such as melt blown or film composites (including laminates) can be combined with the fiber extrusion process of the present invention. The present invention also encompasses mixed fiber embodiments, wherein separated sub-fibers and conventional (e.g., non-split) fibers are simultaneously spun from a single spinneret to produce a sheet of mixed fiber composition. The fibers may be composed of a variety of different resins. Finally, the present invention encompasses the use of separated sub-fibers in thermobonded applications, whether mixed, laminated or stratified.

Having described preferred embodiments of new and improved method and apparatus for extruding easily-splittable plural-component fibers for nonwoven fabrics, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of forming an easily splittable plural-component fiber from plural extruded materials, the method comprising the steps of:
   (a) directing a plurality of first streams of a first material to respectively flow through a plurality of first capillaries to a plurality of first orifices;
   (b) directing a plurality of second streams of a second material to respectively flow through a plurality of second capillaries to a plurality of second orifices that are separate from the first orifices;
   (c) extruding the first streams from the first orifices such that, at the first orifices, the centerlines of the first streams are directed along respective first axes; and
   (d) extruding the second streams from the second orifices such that, at the second orifices, the centerlines of the second streams are directed along second axes that are interleaved, angled and non-intersecting with respect to the first axes such that surfaces of the first streams contact and adhere to surfaces of the second streams to form a plural-component fiber having a transverse cross-section of interleaved segments of the first and second materials.

2. The method of claim 1, wherein the extruded first and second streams form a plural-component fiber having a substantially ribbon-shaped transverse cross-section.

3. The method of claim 2, wherein the extruded first and second materials form a ribbon-shaped plural-component fiber having a ripple-shaped surface.

4. The method of claim 1, wherein the extruded first and second streams form a plural-component fiber having an elongated, curved transverse cross-sectional shape.

5. The method of claim 1, wherein:
   step (c) includes extruding each of the first streams with a transverse cross-sectional shape that is one of: substantially circular, substantially triangular, substantially square or diamond-shape, and substantially multi-lobal; and
   step (d) includes extruding each of the second streams with a transverse cross-sectional shape that is one of: substantially circular, substantially triangular, substantially square or diamond-shape, and substantially multi-lobal.

6. The method of claim 1, wherein the plural-component fiber formed by steps (a) through (d) is a bicomponent fiber.

7. The method of claim 1, wherein the first and second streams are extruded at substantially the same speed.

8. The method of claim 1, wherein steps (a) and (b) include directing the first and second streams to respectively flow through the first and second capillaries with a spinneret.

9. A method of forming an easily splittable plural-component fiber from plural extruded materials, the method comprising the steps of:
   (a) directing a first stream of a first material to flow through a first capillary to a first orifice;
   (b) directing a second stream of a second material to flow through a second capillary to a second orifice that is separate from the first orifice;
   (c) directing a third stream of a third material to flow through a third capillary to a third orifice that is separate from the first and second orifices;
   (d) extruding the first stream from the first orifice such that, at the first orifice, the centerline of the first stream is directed along a first axis;
   (e) extruding the second stream from the second orifice such that, at the second orifice, the centerline of the second stream is directed along a second axis that is non-intersecting with the first axis, the second axis being angled with respect to the first axis and the first and second orifices being relatively positioned such that a surface of the extruded first stream contacts and adheres to a surface of the extruded second stream to form the plural-component fiber; and
   (f) extruding the third stream from the third orifice such that, at the third orifice, the centerline of the third stream is directed along a third axis that is non-intersecting with the first and second axes, the third axis being angled with respect to the first and second axes and the first, second and third orifices being relatively positioned such that a surface of the extruded third stream contacts and adheres to a surface of the extruded second stream to form a multi-component fiber.

* * * * *